United States Patent
Chi et al.

(10) Patent No.: US 11,201,331 B2
(45) Date of Patent: Dec. 14, 2021

(54) POSITIVE ELECTRODE MATERIAL FOR LITHIUM-SULFUR BATTERY, PREPARATION METHOD THEREFOR, AND APPLICATIONS THEREOF

(71) Applicants: Dun Chi, Beijing (CN); Junping Yan, Beijing (CN)

(72) Inventors: Dun Chi, Beijing (CN); Junping Yan, Beijing (CN)

(73) Assignees: Dun Chi, Beijing (CN); Junping Yan, Beijing (CN)

( * ) Notice: Subject to any disclaimer, the term of this patent is extended or adjusted under 35 U.S.C. 154(b) by 232 days.

(21) Appl. No.: 16/476,350

(22) PCT Filed: Jan. 8, 2018

(86) PCT No.: PCT/CN2018/071724
§ 371 (c)(1),
(2) Date: Jul. 8, 2019

(87) PCT Pub. No.: WO2018/127166
PCT Pub. Date: Jul. 12, 2018

(65) Prior Publication Data
US 2020/0044253 A1 Feb. 6, 2020

(30) Foreign Application Priority Data
Jan. 9, 2017 (CN) .......................... 201710013434.9
Jan. 20, 2017 (CN) .......................... 201710052041.9

(51) Int. Cl.
*H01M 4/60* (2006.01)
*H01M 4/04* (2006.01)
(Continued)

(52) U.S. Cl.
CPC .......... *H01M 4/602* (2013.01); *H01M 4/0416* (2013.01); *H01M 4/133* (2013.01); *H01M 10/052* (2013.01); *H01M 2004/028* (2013.01)

(58) Field of Classification Search
CPC .......... H01M 4/60; H01M 4/133; H01M 4/04; H01M 10/052
See application file for complete search history.

(56) References Cited

U.S. PATENT DOCUMENTS

| | | | | |
|---|---|---|---|---|
| 2012/0088154 A1* | 4/2012 | Liu | ....................... | H01M 4/623 429/213 |
| 2013/0164635 A1* | 6/2013 | Schmidt | ................ | H01M 4/133 429/337 |
| 2016/0126589 A1* | 5/2016 | Xiao | ....................... | H01M 4/38 429/50 |

FOREIGN PATENT DOCUMENTS

CN 104091964 A1 * 10/2014

OTHER PUBLICATIONS

Machine Translation of: CN 104091964, Chen et al., Oct. 8, 2014.*

* cited by examiner

*Primary Examiner* — Kenneth J Douyette
(74) *Attorney, Agent, or Firm* — Paratus Law Group, PLLC

(57) ABSTRACT

There is provided a positive electrode material for a lithium-sulfur battery, including a sulfur-rich polymer and graphene, wherein an internal structure of the sulfur-rich polymer is an interpenetrating network structure; the graphene is doped in the sulfur-rich polymer; a particle size of the sulfur-rich polymer is 100-300 meshes; and the number of flake layers of the graphene is 2-10. A preparation method includes: crushing a prepared sulfur-rich polymer into powder, adding a solvent to obtain a solution, performing sufficient stirring processing; performing ultrasonic dispersion on graphene in (Continued)

a solvent to generate a suspension; and mixing the two solutions, then continuing to perform ultrasonic dispersion and stirring, and finally removing the solvent and drying a product to obtain the positive electrode material for a lithium-sulfur battery. The positive electrode material for a lithium-sulfur battery has relatively high conductivity and cycle performance and a long service life, and is simple to operate.

20 Claims, 5 Drawing Sheets

(51) Int. Cl.
*H01M 4/133* (2010.01)
*H01M 10/052* (2010.01)
*H01M 4/02* (2006.01)

POSITIVE ELECTRODE MATERIAL FOR LITHIUM-SULFUR BATTERY, PREPARATION METHOD THEREFOR, AND APPLICATIONS THEREOF

CROSS REFERENCE TO PRIOR APPLICATION

This application is a National Stage Patent Application of PCT International Patent Application No. PCT/CN2018/071724 (filed on Jan. 8, 2018) under 35 U.S.C. § 371, which claims priority to Chinese Patent Application Nos. 201710013434.9 (filed on Jan. 9, 2017) and 201710052041.9 (filed on Jan. 20, 2017), which are all hereby incorporated by reference in their entirety.

TECHNICAL FIELD

The present invention relates to the field of lithium-sulfur battery technologies, and more specifically to a positive electrode material for a lithium-sulfur battery, a preparation method therefor, and applications thereof.

BACKGROUND ART

Currently, with the rapid development of mobile electronic devices, electrically operated vehicles, and electric power storage technologies, a rechargeable battery with higher energy density is required urgently. Now the gravimetric specific energy of the current marketable lithium-ion battery has reached 200 Wh/kg. However, the specific energy thereof is difficult to break through 300 Wh/kg due to the constraint of the theoretical specific capacity of the positive electrode material. As a product of follow-up upgrading and updating technologies of the lithium-ion battery, the lithium-sulfur battery has been highly valued in recent years, and developed countries compete to make huge investment in research and development.

In the chemical system of the lithium-sulfur battery, the theoretical specific energy of the lithium-sulfur battery using lithium metal as the negative electrode and elemental sulfur as the positive electrode can reach 2600 Wh/kg (the theoretical specific capacities of lithium and sulfur are respectively 3860 mAh/g and 1675 mAh/g), which is much larger than the commercial secondary battery used at the present stage. In addition, the low-cost, renewable, and environmentally friendly properties of the elemental sulfur make the system have great commercial value in the future.

Currently, the lithium-sulfur battery has problems such as a low utilization rate of active materials, a short cycle life, a poor rate capability, and low safety, which seriously hinder applications thereof. In order to solve the above-mentioned problems, improving the conductivity of the elemental sulfur and suppressing the shuttle effect in the electrode reaction are imperative. Therefore, screening out a system in which dissolution of lithium polysulfide can be suppressed and a composite positive electrode material prepared has good conductivity becomes a key point of research.

In the prior art of the lithium-sulfur battery, the utilization rate of sulfur, which is the main active material of positive electrode, is not high, the cycle capacity is attenuated severely, the cycle performance is relatively poor and the electrochemical performance is poor. In order to improve the performance of the lithium-sulfur battery, research is focused on modification of the positive electrode material of the lithium-sulfur battery to improve the conductivity and cycle performance thereof. For example, elemental sulfur and conductive graphite are simply mixed to improve the conductivity of the positive electrode, but the shuttle effect of the sulfur during the reaction cannot be avoided, resulting in rapid attenuation of capacity; Or stuff sulfur into pores of mesoporous carbon, and addition of the mesoporous carbon would improve the conductivity and increases the constraint to the sulfur to some extent, but it also increases the complexity of the manufacturing process; In addition, researchers used conductive polymers to modify the elemental sulfur. In the conductive polymers, additions of conductive high molecule such as polythiophene, polyaniline (PANI), and polyacrylonitrile (PAN) can improve the cycle performance of the lithium-sulfur battery to some extent, but the requirement of overall improvement to the positive electrode material cannot be satisfied due to the low degree of polymerization.

Meanwhile, although the above-described method of modifying the positive electrode material utilizing sulfur can improve the conductivity or improve the cycle performance of the lithium-sulfur battery to some extent, the energy density of the obtained lithium-sulfur battery is lowered, that is, such of the method of modifying the positive electrode material utilizing sulfur cannot overall improve the performance of the lithium-sulfur battery. In addition, some seemingly advanced, but actually complex, expensive, and unsustainable synthetic steps appear after these methods do; therefore, mass production of lithium-sulfur battery cannot be performed.

Therefore, the present invention provides a positive electrode material for a lithium-sulfur battery and a preparation method thereof. The positive electrode material for a lithium-sulfur battery provided by the present invention has relatively high conductivity and cycle performance and a long service life; Meanwhile, the present invention is simple to operate, low in cost, and easy in large-scale manufacturing and commercialization.

SUMMARY OF THE INVENTION

An objective of the present invention is to provide a positive electrode material for a lithium-sulfur battery. An initial charge-discharge capacity of the positive electrode material for a lithium-sulfur battery provided by the present invention is about 1300 mAh/g and it would keep at about 1100 mAh/g after 50 times of charge-discharge cycling. So it has a better cycle stability.

Another objective of the present invention is to provide a preparation method of a positive electrode material for a lithium-sulfur battery.

The third objective of the present invention is to provide an application of a positive electrode material for a lithium-sulfur battery.

In order to achieve the above-described objectives, the present invention adopts the following technical solution.

A positive electrode material for a lithium-sulfur battery comprises a sulfur-rich polymer and graphene, wherein an internal structure of the sulfur-rich polymer is an interpenetrating network structure; the graphene is doped in the sulfur-rich polymer; a particle size of the sulfur-rich polymer is 100-300 meshes, so as to facilitate doping with graphene and mixing with conductive graphite and an adhesive in a subsequent manufacturing process of positive electrode; and the number of flake layers of the reduced graphene oxide is 2-10, the reduced graphene oxide has a stable performance, high conductivity, a large specific surface area, and two-dimensional spatial topography which can be effectively cover on a sulfur particle surface to form a conductive network structure and provide very high electron conduction, thereby reducing interparticle interface impedance and finally effectively improving electrochemical activity of sulfur. On the other hand, flexibility of the graphene is beneficial to buffer volumetric strain of the sulfur in a cyclic process, and a porous structure constructed by the graphene can effectively suppress diffusion of polysulfide ions to a main body of an electrolyte.

In consideration of an comprehensive balance between economic costs and performance effects, preferably, in the positive electrode material, the graphene is 1-3% and the sulfur-rich polymer is 97-99% by mass percent. In this range, a loading amount of elemental sulfur is 61-70%, which can satisfy design requirements of the lithium-sulfur battery for an comprehensive balance between specific energy, a life, and performance.

A sulfur-rich polymer material constructs the interpenetrating network structure therein, which can effectively suppress dissolution of a polysulfide, which is an intermediate product of discharging, thereby improving a cycle performance of the lithium-sulfur battery; resilience of the polymer offsets stress generated by the sulfur due to a volumetric change during a period of a charge-discharge cycle, thereby effectively improving a mechanical failure mode; and the excellent flexibility of the graphene provides sufficient space for a volume effect of the sulfur, to avoid damage to the lithium-sulfur battery resulting from the volume effect of the sulfur, thereby prolonging the service life of the lithium-sulfur battery. Doping of the graphene also can reinforce combination of the sulfur-rich polymer with the conductive graphite during a preparation process of positive electrode, thereby improving overall conductivity of the positive electrode material.

Compared with an positive electrode using elemental sulfur, solubility of an active substance of the sulfur-rich polymer in an electrolyte solution is reduced and a self-discharge rate is reduced. An organic sulfur group in the sulfur-rich polymer suppresses irreversible deposition of a discharge product on the surface of a lithium negative electrode, thereby improving an electrochemical performance of the lithium-sulfur battery.

Preferably, the sulfur-rich polymer is prepared by copolymerizing an 3-pentadecyl-phenol-based phenolic resin monomer with the elemental sulfur; the 3-pentadecyl-phenol-based phenolic resin monomer is a liquid, and the polymer obtained after thermal polymerization is an elastomer in room temperature, which can regulate stress generated by the positive electrode of the lithium-sulfur battery during a use process due to a volumetric change, thereby reducing a possibility of mechanical failure of the electrode.

Preferably, the 3-pentadecyl-phenol-based phenolic resin monomer is obtained by condensing 3-pentadecyl-phenol, paraformaldehyde, and amine, wherein the amine is aromatic amine or fatty amine, the aromatic amine comprises but is not limited to aniline, toluidine, and benzidine, and the fatty amine comprises but is not limited to ethylenediamine, hexamethylenediamine, diethylenetriamine, and triethylenetetramine.

Preferably, a mass ratio of the 3-pentadecyl-phenol-based phenolic resin monomer to the elemental sulfur is 1:1 to 19.

Preferably, the graphene is a reduced graphene oxide.

In order to achieve the above-described second objective, the present invention adopts the following technical solution.

A preparation method of a positive electrode material for a lithium-sulfur battery comprises the following steps:

1) preparing sulfur-rich polymer particles
crushing a sulfur-rich polymer prepared by copolymerizing an 3-pentadecyl-phenol-based phenolic resin monomer with elemental sulfur, to obtain sulfur-rich polymer particles which a particle size thereof is 100-300 meshes, adding a solvent and performing stirring or ultrasonic dispersion processing to form a solution;
2) preparing a suspension containing graphene
performing ultrasonic dispersion on graphene in a solvent to generate a suspension; and
3) preparing the positive electrode material for a lithium-sulfur battery mixing the two solutions prepared in steps 1) and 2) in a container, then continuing to perform ultrasonic dispersion and stirring, and finally removing the solvent and drying a product to obtain the positive electrode material for a lithium-sulfur battery.

Preferably, duration of the stirring or ultrasonic dispersion in step 1) is 1-10 hours, a temperature is 20-50° C.; duration of the ultrasonic processing in step 2) is 1-10 hours, a temperature is 20-30° C.; and duration of the ultrasonic processing in step 3) is 1-10 hours, a temperature is 20-50° C.

Preferably, the solvent is tetrahydrothran, toluene, dimethylformamide, or N-methylpyrrolidone.

For such positive electrode material for a lithium-sulfur battery prepared by means of a technically operable and economically feasible method, an initial specific capacity thereof can reach 1250 mAh/g. The specific capacity thereof is at a level of 950 mAh/g under a current of 200 mA/g after 100 times of cycling. And performance thereof keeps at a relatively stable level.

In order to achieve the above-described third objective, the present invention adopts the following technical solution.

An application of a positive electrode material for a lithium-sulfur battery is used for preparation of a lithium-sulfur battery, wherein the lithium-sulfur battery comprises a battery housing, an electrode core, and an electrolyte, the electrode core and the electrolyte are sealed and contained in in the battery housing, the electrode core comprises a positive electrode, a negative electrode, and a diaphragm between the positive electrode and the negative electrode. The positive electrode comprises a current collector and a positive electrode material carried on the current collector, the positive electrode material comprises a active material of positive electrode, an adhesive of positive electrode, and a conductive component. Based on the total weight of the composition form by all components, the amount of the active material of positive electrode is 60-85%, the amount of the adhesive of positive electrode is 5-10%, and the amount of the conductive component is 10-30%; and the negative electrode is lithium metal.

The beneficial effects of the present invention are as follows.

(1) The present invention adopts the sulfur-rich polymer, wherein the solubility of the active material of the sulfur-rich polymer in the electrolyte solution is reduced compared with the positive electrode using elemental sulfur and the self-discharge rate is reduced; and the organic sulfur group in the sulfur-rich polymer suppresses the irreversible deposition of the discharge product on the surface of the negative electrode, thereby improving the electrochemical performance of the lithium-sulfur battery.

(2) The 3-pentadecyl-phenol-based phenolic resin monomer in the present invention is a liquid, and the polymer obtained after thermal polymerization is an elastomer in room temperature, which can regulate the stress generated by the positive electrode of the lithium-sulfur battery during the use process due to the volumetric change, thereby reducing the possibility of mechanical failure of the electrode.

(3) The doping of the graphene in the present invention can reinforce the combination of the sulfur-rich polymer with the conductive graphite during the preparation process of positive electrode, thereby improving the overall conductivity of the positive electrode material.

(4) The positive electrode material for a lithium-sulfur battery prepared by the present invention has relatively high conductivity and cycle performance and a long service life; Meanwhile, the present invention is simple to operate, low in cost, and easy in large-scale manufacturing and commercialization.

DESCRIPTION OF THE DRAWINGS

The specific implementation manners of the present invention will be described in further detail below with reference to the drawings.

DETAILED DESCRIPTION OF EMBODIMENTS

Figure 1:
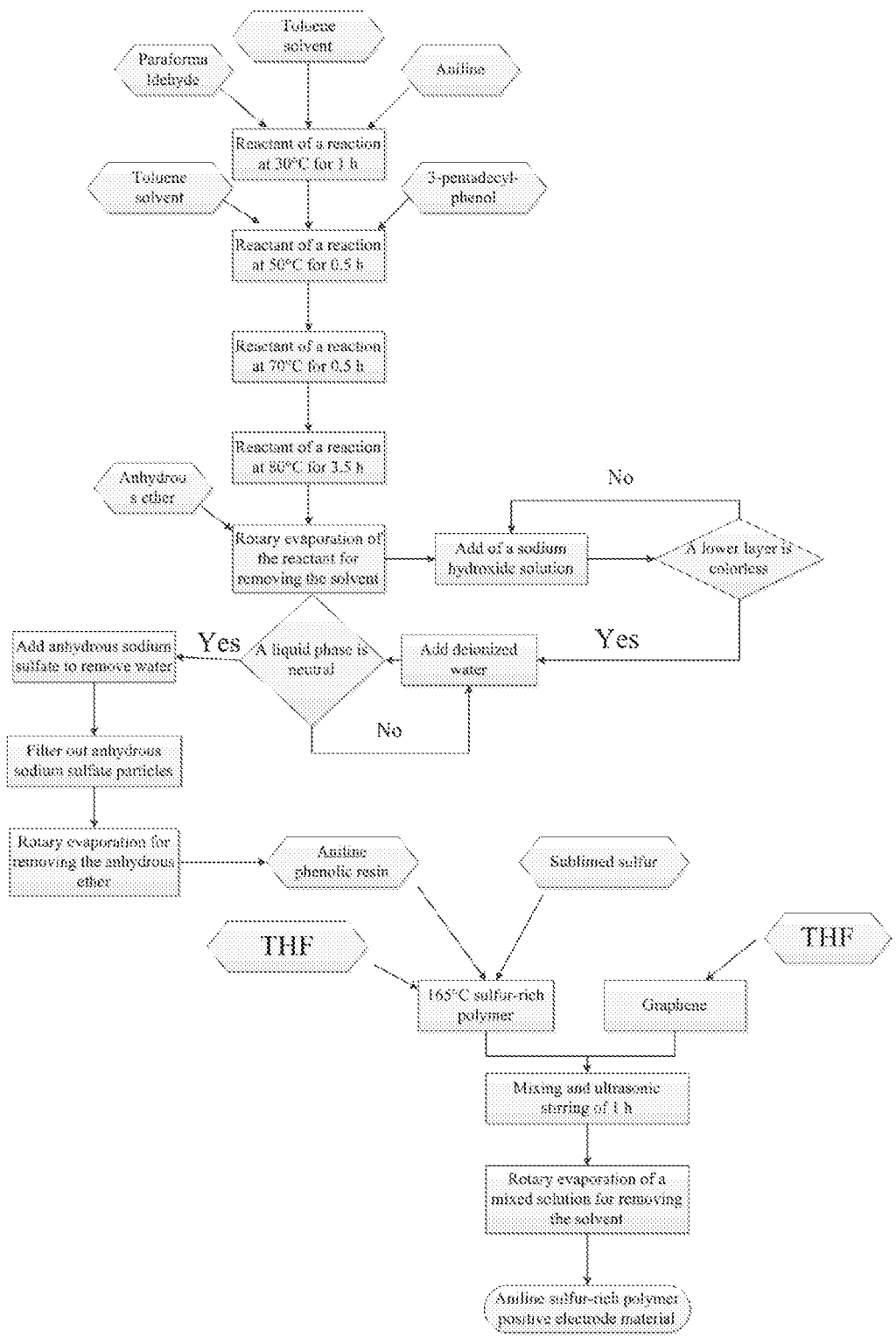
FIG. 1 illustrates a schematic diagram of a process for preparing an aniline positive electrode material in embodiment 1 of the present invention.

In order to describe the present invention more clearly, the present invention will be further described below with reference to the preferred embodiments and the drawings. Similar components in the drawings are represented by the same reference number. One skilled in the art should understand that the following detailed description is merely for illustration instead of for limitation, and the protection scope of the present invention should not be limited thereto.

Embodiment 1

Preparation of an aniline positive electrode material comprises the following steps.

1) Preparation of an Aniline Phenolic Resin Monomer 0.4 mol of paraformaldehyde, 0.2 mol of aniline, and 100 nil of toluene solvent are respectively added into a 1000 mL four-necked flask, to which a thermometer, a constant pressure funnel, a stir bar, and a condensing tube are connected, stirring is performed at 30° C. for 1 h (i.e. hour), then temperature is increased to 50° C. 0.2 mol of 3-pentadecyl-phenol is fully dissolved in 100 mL of toluene, the mixed solution of the 3-pentadecyl-phenol and the toluene is dripped into the flask via the constant pressure funnel After the dripping is completed and a reaction is performed for 0.5 h, the temperature is increased again to 70° C. for a reaction for 0.5 h, and finally the temperature is increased to 80° C. for a reaction for 3.5 h, wherein the whole process is kept under negative pressure. A reaction solution is poured into a 500 mL single-necked flask after being cooled, and a solvent is removed by means of rotary evaporation in a rotary evaporator. A raw product is fully dissolved in anhydrous ether. Washing is first performed multiple times by using a 2 mol/L sodium hydroxide solution until a lower layer is colorless, washing is performed again by using deionized water until an aqueous phase is neutral, then anhydrous sodium sulfate is added to a separated organic phase to remove water. Filtration is performed to remove sodium sulfite particles, rotary evaporation is performed to remove the anhydrous ether, and finally drying is performed to obtain the aniline phenolic resin monomer in a brownish red transparent liquid state.

2) Preparation of a Sulfur-Rich Polymer 90 g of sublimed sulfur is added into a 400 mL beaker equipped with a magnetic stir bar, and heated to 185° C. in an oil bath provided with a temperature controller, to obtain a clear orange-yellow viscous liquid phase. 10 g of the phenolic resin monomer obtained in the step 1) is directly injected into molten sulfur, and a mixture is stirred at 185° C. for 10 minutes and slowly cooled to room temperature to obtain the sulfur-rich polymer.

3) Preparation of the Aniline Positive Electrode Material

The sulfur-rich polymer prepared in step 2) is crushed at 25° C. to obtain sulfur-rich polymer particles of which a particle size thereof is 100 to 300 meshes, 15 g of the powdery sulfur-rich polymer is uniformly dispersed in 300 mL of tetrahydrofuran (THF), and ultrasonic processing is performed for 1 hour.

Then 380 mg of reduced graphene oxide is added to 300 ml of THE, and ultrasonic processing is performed on a generated suspension for 2 hours.

The above two solutions are mixed, then ultrasonic dispersion and stirring are continued to be performed at 25° C. for 1 hour. Finally, a solvent is removed by using the rotary evaporator, and a product is dried. A flow chart of a preparation process thereof is as shown in FIG. 1.

Finally, the positive electrode material of aniline sulfur-rich polymer in a grey powdery state is obtained.

Embodiment 2

Steps for preparing a hexamethylenediamine positive electrode material are similar to those in embodiment 1, and a difference lies in:
in step 1) for preparing a hexamethylenediamine phenolic resin monomer, the 0.2 mol of aniline is substituted by 0.1 mol of hexamethylenediamine.

Figure 2:
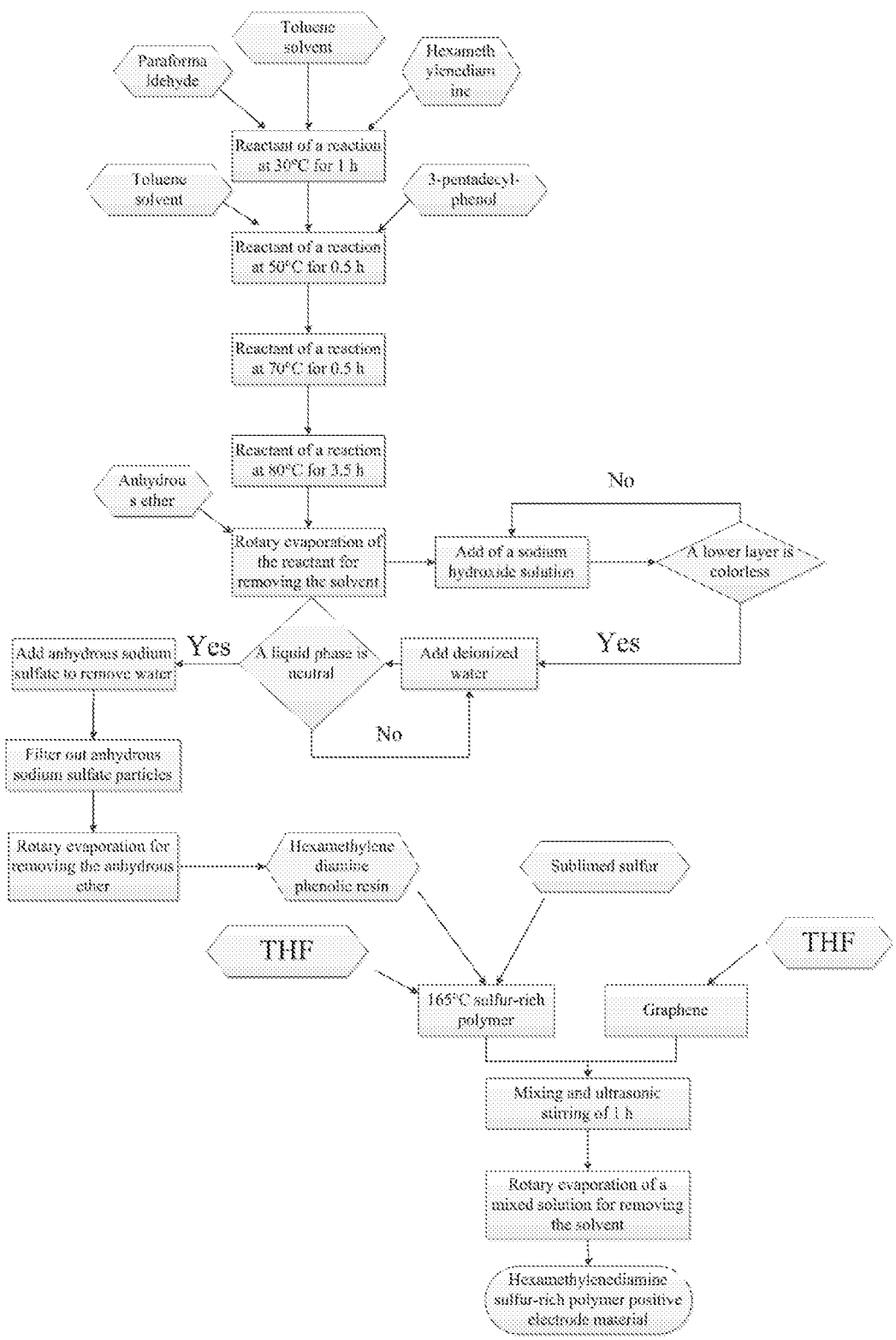
FIG. 2 illustrates a schematic diagram of a process for preparing a hexamethylenediamine positive electrode material in embodiment 2 of the present invention.

A flow chart of a preparation process thereof is as shown in FIG. 2.

Finally, the positive electrode material of hexamethylenediamine sulfur-rich polymer in a grey powdery state is obtained.

Embodiment 3

Steps for preparing an aniline positive electrode material are similar to those in embodiment 1, and differences lie in:

In step 1) for preparing an aniline phenolic resin monomer, 0.4 mol of paraformaldehyde, 0.2 mol of aniline, and 0.2 mol of 3-pentadecyl-phenol are added into a 1000 mL four-necked flask at the same time, to which a thermometer, a constant pressure funnel, a stir bar, and a condensing tube are connected. Stirring is performed at 30° C. for 1 h, then temperature is increased to 50° C. for a reaction for 0.5 h, the temperature is increased again to 70° C. for a reaction for 0.5 h, and finally the temperature is increased to 80° C. for a reaction for 3.5 h, wherein the whole process is kept under negative pressure.

Figure 3:
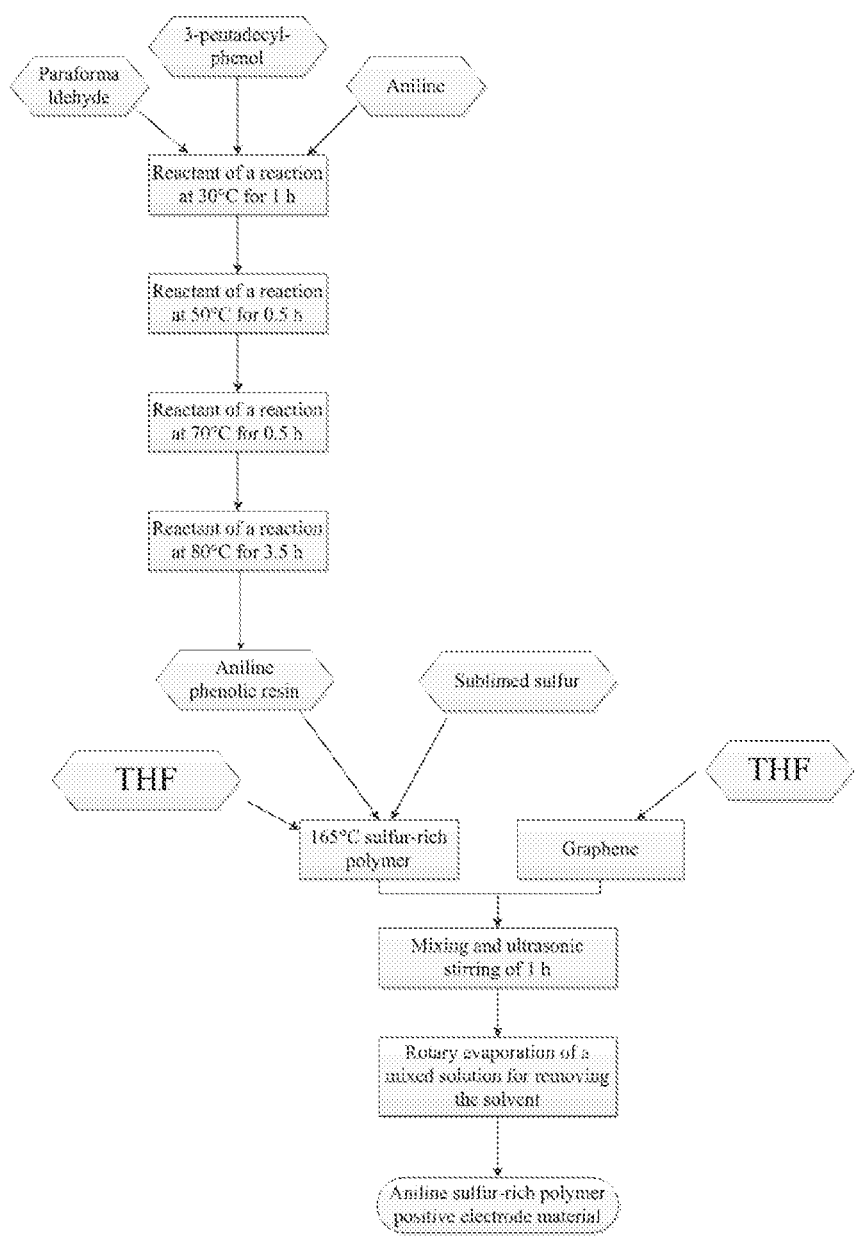
FIG. 3 illustrates a schematic diagram of a process for preparing an aniline positive electrode material in embodiment 3 of the present invention.

A flow chart of a preparation process thereof is as shown in FIG. 3.

Finally, the positive electrode material of aniline sulfur-rich polymer in a grey powdery state is obtained.

Embodiment 4

Steps for preparing a hexamethylenediamine positive electrode material are similar to those in embodiment 3, and a difference lies in:
in step 1) for preparing a hexamethylenediamine phenolic resin monomer, the 0.2 mol of aniline is substituted by 0.1 mol of hexamethylenediamine.

Figure 4:
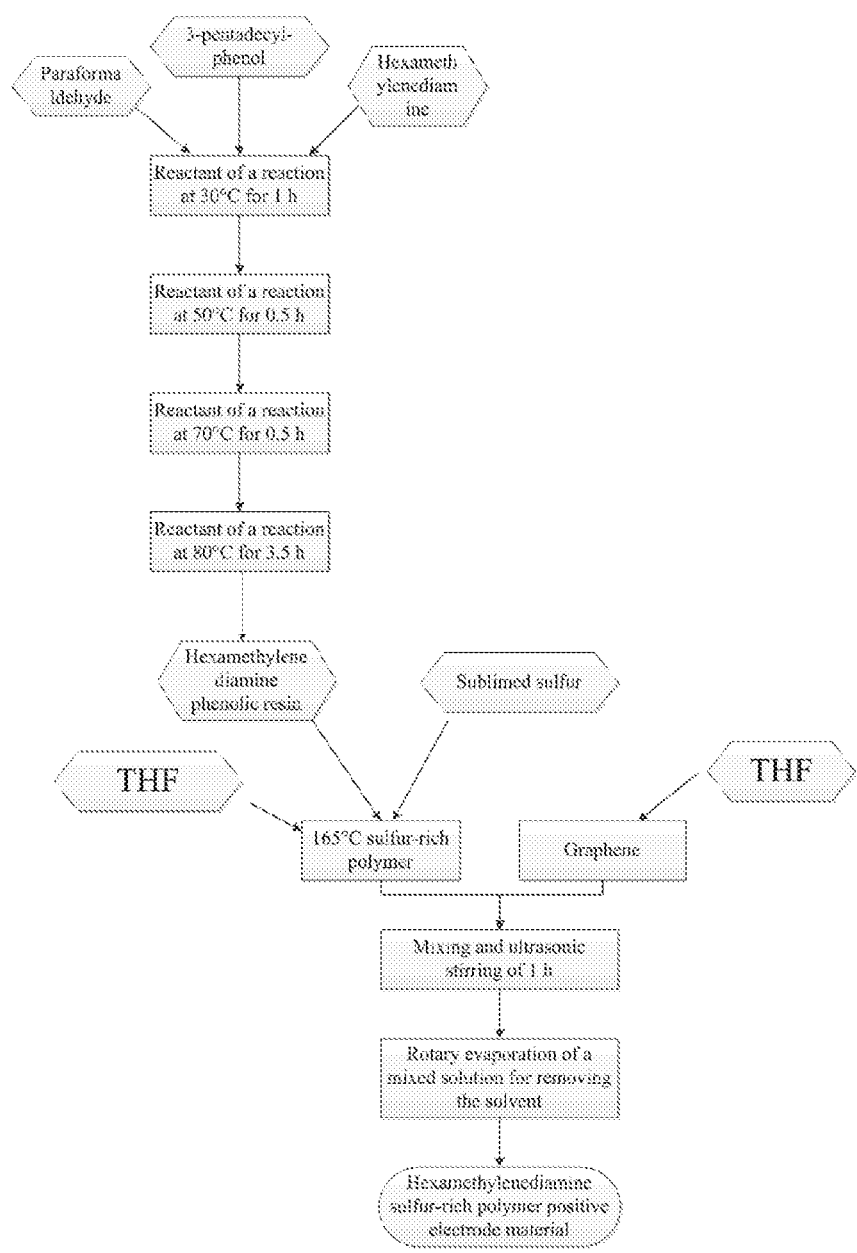
FIG. 4 illustrates a process for preparing a hexamethylenediamine positive electrode material in embodiment 4 of the present invention.

A flow chart of a preparation process thereof is as shown in FIG. 4.

Finally, the positive electrode material of hexamethylenediamine sulfur-rich polymer in a grey powdery state is obtained.

Embodiment 5

A lithium-sulfur battery is prepared by using the positive electrode material prepared in embodiment 1 of the present invention, wherein the lithium-sulfur battery comprises a battery housing, an pole core, and an electrolyte, the pole core and the electrolyte are sealed and contained in the battery housing, the pole core comprises a positive electrode, a negative electrode, and a diaphragm between the positive electrode and the negative electrode. The positive electrode comprises a current collector and a positive electrode material carried on the current collector, the positive electrode material comprises a active material of positive electrode, an adhesive of positive electrode, and a conductive component. Based on the total weight of the composition form by all components, the amount of the active material of positive electrode is 70%, the amount of the adhesive of positive electrode is 10%, and the amount of the conductive component is 20%; and the negative electrode is lithium metal.

Figure 5:
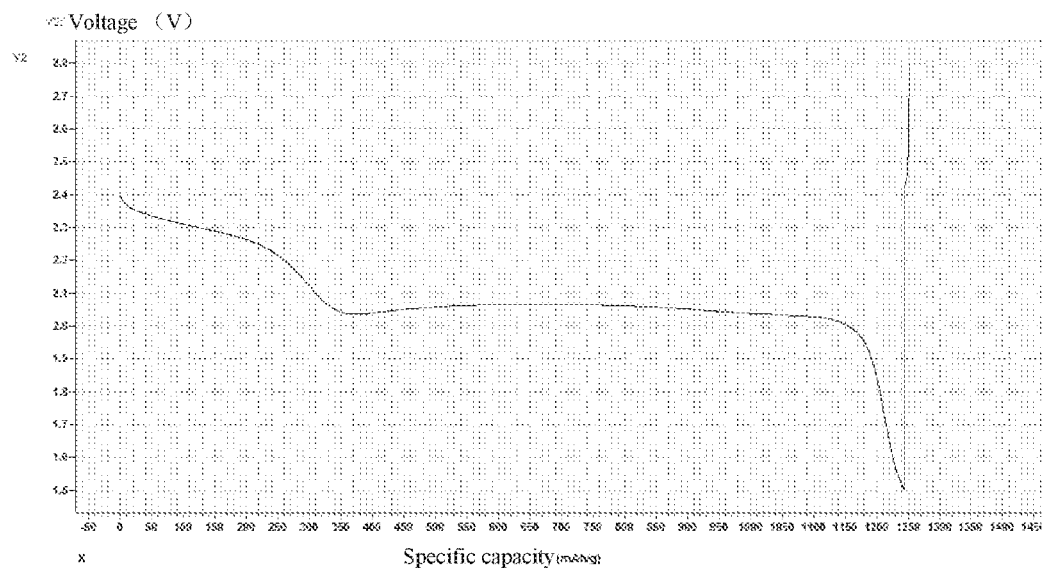
FIG. 5 illustrates a test diagram of an initial specific capacity of a lithium-sulfur battery in embodiment 5 of the present invention.

A result of a performance test for the above-described battery is as shown in FIG. 5, wherein initial discharge is performed in an environment in which room temperature is 20-25° C. under a current of 200 mA/g and a discharge rate of 0.1 C, a termination voltage is 1.5 V, and a specific capacity thereof can reach 1250 mAh/g.

Figure 6:
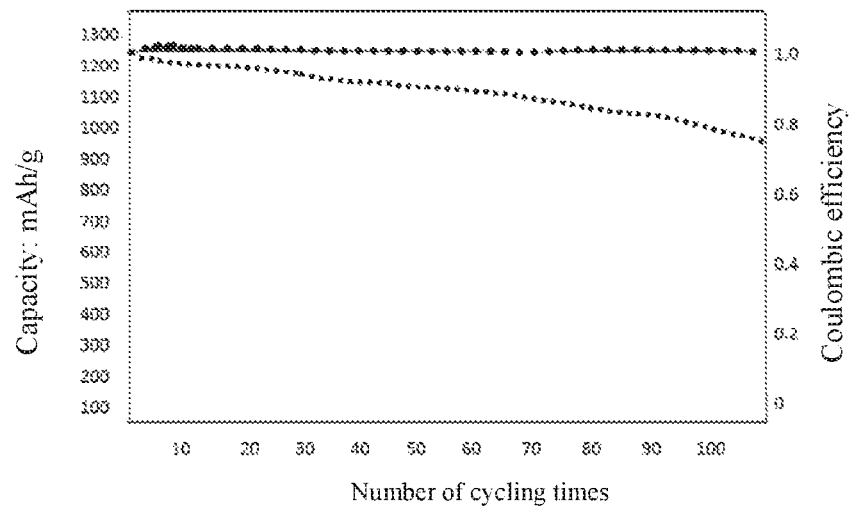
FIG. 6 illustrates a curve diagram of a cycle life of a lithium-sulfur battery in embodiment 5 of the present invention.

As shown in FIG. 6, a charge-discharge cycling test of discharge rate of 0.1 C is performed in a voltage range of 2.7 V-1.6 V, after 100 times of cycling, the specific capacity still keeps at 950 mAh/g, indicating a good cycle performance.

Conclusion: the 3-pentadecyl-phenol-based phenolic resin monomer is subject to ring-opening at 185° C. and polymerized with the elemental sulfur to form a sulfur-rich polymer having an interpenetrating network structure. The reduced graphene oxide is doped in the polymer, so that the polymer cooperates with the conductive graphite material added during a subsequent preparation process of positive electrode to generate a synergistic effect, thereby optimizing the conductive effect of the sulfur-rich polymer and suppressing the shuttle effect of the sulfur element on the positive electrode. The product of the present invention has excellent effects on all of the aspects such as the positive electrode capacity, the operating life, and the economy of the lithium-sulfur battery. Apparently, the above-described embodiments of the present invention are merely illustrations for clear description of the present invention instead of limitations to the implementation manners of the present invention, one skilled in the art can further make other variations or modifications of different forms on the basis of the above description, all of the implementation manners cannot be listed herein, and any obvious variations or modifications derived from the technical solution of the present invention still fall within the protection scope of the present invention.

The invention claimed is:

1. A positive electrode material for a lithium-sulfur battery, wherein the positive electrode material comprises a sulfur-rich polymer and graphene; an internal structure of the sulfur-rich polymer is an interpenetrating network structure; the graphene is doped in the sulfur-rich polymer; a particle size of the sulfur-rich polymer is 100-300 meshes; and the number of flake layers of the graphene is 2-10.

2. The positive electrode material for a lithium-sulfur battery according to claim 1, wherein in the positive electrode material, the graphene is 1-3% and the sulfur-rich polymer is 97-99% by mass percent.

3. The positive electrode material for a lithium-sulfur battery according to claim 1, wherein the sulfur-rich polymer is prepared by copolymerizing a 3-pentadecyl-phenol-based phenolic resin monomer with elemental sulfur.

4. The positive electrode material for a lithium-sulfur battery according to claim 3, wherein the 3-pentadecyl-phenol-based phenolic resin monomer is obtained by condensing 3-pentadecyl-phenol, paraformaldehyde and amine, wherein the amine is aromatic amine or fatty amine, the aromatic amine comprises aniline, toluidine, and benzidine, and the fatty amine comprises ethylenediamine, hexamethylenediamine, diethylenetriamine, and triethylenetetramine.

5. The positive electrode material for a lithium-sulfur battery according to claim 3, wherein a mass ratio of the 3-pentadecyl-phenol-based phenolic resin monomer to the elemental sulfur is 1:1 to 19.

6. The positive electrode material for a lithium-sulfur battery according to claim 1, wherein the graphene is a reduced graphene oxide.

7. A preparation method of the positive electrode material for a lithium-sulfur battery according to claim 1, comprising the following steps:
   1) preparing sulfur-rich polymer particles:
   crushing a sulfur-rich polymer prepared by copolymerizing an 3-pentadecyl-phenol-based phenolic resin monomer with elemental sulfur, to obtain sulfur-rich polymer particles of which a particle size thereof is 100-300 meshes; adding a solvent and performing stirring or ultrasonic dispersion processing to form a solution;
   2) preparing a graphene suspension:
   performing ultrasonic dispersion on graphene in a solvent to generate a suspension; and
   3) preparing the positive electrode material for a lithium-sulfur battery:
   mixing the two solutions prepared in steps 1) and 2), then continuing to perform ultrasonic dispersion and stirring, and finally removing the solvent and drying a product to obtain the positive electrode material for a lithium-sulfur battery.

8. The preparation method of a positive electrode material for a lithium-sulfur battery according to claim 7, wherein duration of the stirring or ultrasonic dispersion in step 1) is 1-10 hours, a temperature is 20-50° C.; duration of the ultrasonic processing in step 2) is 1-10 hours, a temperature is 20-30° C.; and duration of the ultrasonic processing in step 3) is 1-10 hours, a temperature is 20-50° C.

9. The preparation method of a positive electrode material for a lithium-sulfur battery according to claim 7, wherein the solvent is tetrahydrofuran, toluene, dimethylformamide, or N-methylpyrrolidone.

10. An application of the positive electrode material for a lithium-sulfur battery according to claim 1, which is used for preparation of a lithium-sulfur battery, wherein the lithium-sulfur battery comprises a battery housing, an electrode core and an electrolyte, wherein the electrode core and the electrolyte are sealed and received in in the battery housing, the electrode core comprises a positive electrode, a negative electrode, and a diaphragm between the positive electrode and the negative electrode, wherein the positive electrode comprises a current collector and a positive electrode material carried on the current collector, the positive electrode material comprises a positive electrode active material, a positive electrode adhesive, and a conductive component, wherein based on that a total weight of a composition formed by all components serves as a standard, the amount of the positive electrode active material is 60-85%, the amount of the positive electrode adhesive is 5-10%, and the amount of the conductive component is 10-30%; and the negative electrode is lithium metal.

11. A preparation method of the positive electrode material for a lithium-sulfur battery according to claim 2, comprising the following steps:
1) preparing sulfur-rich polymer particles:
crushing a sulfur-rich polymer prepared by copolymerizing an 3-pentadecyl-phenol-based phenolic resin monomer with elemental sulfur, to obtain sulfur-rich polymer particles of which a particle size thereof is 100-300 meshes; adding a solvent and performing stirring or ultrasonic dispersion processing to form a solution;
2) preparing a graphene suspension:
performing ultrasonic dispersion on graphene in a solvent to generate a suspension; and
3) preparing the positive electrode material for a lithium-sulfur battery:
mixing the two solutions prepared in steps 1) and 2), then continuing to perform ultrasonic dispersion and stirring, and finally removing the solvent and drying a product to obtain the positive electrode material for a lithium-sulfur battery.

12. A preparation method of the positive electrode material for a lithium-sulfur battery according to claim 3, comprising the following steps:
1) preparing sulfur-rich polymer particles:
crushing a sulfur-rich polymer prepared by copolymerizing an 3-pentadecyl-phenol-based phenolic resin monomer with elemental sulfur, to obtain sulfur-rich polymer particles of which a particle size thereof is 100-300 meshes; adding a solvent and performing stirring or ultrasonic dispersion processing to form a solution;
2) preparing a graphene suspension:
performing ultrasonic dispersion on graphene in a solvent to generate a suspension; and
3) preparing the positive electrode material for a lithium-sulfur battery:
mixing the two solutions prepared in steps 1) and 2), then continuing to perform ultrasonic dispersion and stirring, and finally removing the solvent and drying a product to obtain the positive electrode material for a lithium-sulfur battery.

13. A preparation method of the positive electrode material for a lithium-sulfur battery according to claim 4, comprising the following steps:
1) preparing sulfur-rich polymer particles:
crushing a sulfur-rich polymer prepared by copolymerizing an 3-pentadecyl-phenol-based phenolic resin monomer with elemental sulfur, to obtain sulfur-rich polymer particles of which a particle size thereof is 100-300 meshes; adding a solvent and performing stirring or ultrasonic dispersion processing to form a solution;
2) preparing a graphene suspension:
performing ultrasonic dispersion on graphene in a solvent to generate a suspension; and
3) preparing the positive electrode material for a lithium-sulfur battery:
mixing the two solutions prepared in steps 1) and 2), then continuing to perform ultrasonic dispersion and stirring, and finally removing the solvent and drying a product to obtain the positive electrode material for a lithium-sulfur battery.

14. A preparation method of the positive electrode material for a lithium-sulfur battery according to claim 5, comprising the following steps:
1) preparing sulfur-rich polymer particles:
crushing a sulfur-rich polymer prepared by copolymerizing an 3-pentadecyl-phenol-based phenolic resin monomer with elemental sulfur, to obtain sulfur-rich polymer particles of which a particle size thereof is 100-300 meshes; adding a solvent and performing stirring or ultrasonic dispersion processing to form a solution;
2) preparing a graphene suspension:
performing ultrasonic dispersion on graphene in a solvent to generate a suspension; and
3) preparing the positive electrode material for a lithium-sulfur battery:
mixing the two solutions prepared in steps 1) and 2), then continuing to perform ultrasonic dispersion and stirring, and finally removing the solvent and drying a product to obtain the positive electrode material for a lithium-sulfur battery.

15. A preparation method of the positive electrode material for a lithium-sulfur battery according to claim 6, comprising the following steps:
1) preparing sulfur-rich polymer particles:
crushing a sulfur-rich polymer prepared by copolymerizing an 3-pentadecyl-phenol-based phenolic resin monomer with elemental sulfur, to obtain sulfur-rich polymer particles of which a particle size thereof is 100-300 meshes; adding a solvent and performing stirring or ultrasonic dispersion processing to form a solution;
2) preparing a graphene suspension:
performing ultrasonic dispersion on graphene in a solvent to generate a suspension; and
3) preparing the positive electrode material for a lithium-sulfur battery:

mixing the two solutions prepared in steps 1) and 2), then continuing to perform ultrasonic dispersion and stirring, and finally removing the solvent and drying a product to obtain the positive electrode material for a lithium-sulfur battery.

16. An application of the positive electrode material for a lithium-sulfur battery according to claim 2, which is used for preparation of a lithium-sulfur battery, wherein the lithium-sulfur battery comprises a battery housing, an electrode core and an electrolyte, wherein the electrode core and the electrolyte are sealed and received in in the battery housing, the electrode core comprises a positive electrode, a negative electrode, and a diaphragm between the positive electrode and the negative electrode, wherein the positive electrode comprises a current collector and a positive electrode material carried on the current collector, the positive electrode material comprises a positive electrode active material, a positive electrode adhesive, and a conductive component, wherein based on that a total weight of a composition formed by all components serves as a standard, the amount of the positive electrode active material is 60-85%, the amount of the positive electrode adhesive is 5-10%, and the amount of the conductive component is 10-30%; and the negative electrode is lithium metal.

17. An application of the positive electrode material for a lithium-sulfur battery according to claim 3, which is used for preparation of a lithium-sulfur battery, wherein the lithium-sulfur battery comprises a battery housing, an electrode core and an electrolyte, wherein the electrode core and the electrolyte are sealed and received in in the battery housing, the electrode core comprises a positive electrode, a negative electrode, and a diaphragm between the positive electrode and the negative electrode, wherein the positive electrode comprises a current collector and a positive electrode material carried on the current collector, the positive electrode material comprises a positive electrode active material, a positive electrode adhesive, and a conductive component, wherein based on that a total weight of a composition formed by all components serves as a standard, the amount of the positive electrode active material is 60-85%, the amount of the positive electrode adhesive is 5-10%, and the amount of the conductive component is 10-30%; and the negative electrode is lithium metal.

18. An application of the positive electrode material for a lithium-sulfur battery according to claim 4, which is used for preparation of a lithium-sulfur battery, wherein the lithium-sulfur battery comprises a battery housing, an electrode core and an electrolyte, wherein the electrode core and the electrolyte are sealed and received in in the battery housing, the electrode core comprises a positive electrode, a negative electrode, and a diaphragm between the positive electrode and the negative electrode, wherein the positive electrode comprises a current collector and a positive electrode material carried on the current collector, the positive electrode material comprises a positive electrode active material, a positive electrode adhesive, and a conductive component, wherein based on that a total weight of a composition formed by all components serves as a standard, the amount of the positive electrode active material is 60-85%, the amount of the positive electrode adhesive is 5-10%, and the amount of the conductive component is 10-30%; and the negative electrode is lithium metal.

19. An application of the positive electrode material for a lithium-sulfur battery according to claim 5, which is used for preparation of a lithium-sulfur battery, wherein the lithium-sulfur battery comprises a battery housing, an electrode core and an electrolyte, wherein the electrode core and the electrolyte are sealed and received in in the battery housing, the electrode core comprises a positive electrode, a negative electrode, and a diaphragm between the positive electrode and the negative electrode, wherein the positive electrode comprises a current collector and a positive electrode material carried on the current collector, the positive electrode material comprises a positive electrode active material, a positive electrode adhesive, and a conductive component, wherein based on that a total weight of a composition formed by all components serves as a standard, the amount of the positive electrode active material is 60-85%, the amount of the positive electrode adhesive is 5-10%, and the amount of the conductive component is 10-30%; and the negative electrode is lithium metal.

20. An application of the positive electrode material for a lithium-sulfur battery according to claim 6, which is used for preparation of a lithium-sulfur battery, wherein the lithium-sulfur battery comprises a battery housing, an electrode core and an electrolyte, wherein the electrode core and the electrolyte are sealed and received in in the battery housing, the electrode core comprises a positive electrode, a negative electrode, and a diaphragm between the positive electrode and the negative electrode, wherein the positive electrode comprises a current collector and a positive electrode material carried on the current collector, the positive electrode material comprises a positive electrode active material, a positive electrode adhesive, and a conductive component, wherein based on that a total weight of a composition formed by all components serves as a standard, the amount of the positive electrode active material is 60-85%, the amount of the positive electrode adhesive is 5-10%, and the amount of the conductive component is 10-30%; and the negative electrode is lithium metal.

\* \* \* \* \*